June 4, 1968 J. EVANS ET AL 3,387,272

CONTENT ADDRESSABLE MEMORY SYSTEM USING ADDRESS TRANSFORMATION CIRCUITS

Filed Dec. 23, 1964 9 Sheets-Sheet 1

INVENTORS
JAMES EVANS
JOHN H. FLORKOWSKI

BY [signature]
ATTORNEY

United States Patent Office 3,387,272
Patented June 4, 1968

3,387,272

CONTENT ADDRESSABLE MEMORY SYSTEM USING ADDRESS TRANSFORMATION CIRCUITS

James Evans, Stamford, Conn., and John H. Florkowski, Yorktown Heights, N.Y., assignors to International Business Machines Corporation, Armonk, N.Y., a corporation of New York Filed Dec. 23, 1964, Ser. No. 420,576
15 Claims. (Cl. 340—172.5)

ABSTRACT OF THE DISCLOSURE

The content addressable memory system is one in which a plurality of information items, each including data and identifier portions, are stored in a plurality of addressable memory locations in a random access memory. Key transformation for the addresses is employed so that each information item is stored at an address which is an address transformation of the contents of the identifier portion of the item. The memory is formed of three different memory units each of which has its own address circuitry. Three separate address transform circuits are provided each of which operates according to different criteria to produce a different address when an identifier is applied to the circuit. During a storage operation the identifier of the item to be stored is applied to each of these three address transform circuits which generate transformed addresses for the three memory units. The input item is stored in one of these units if the addressed location is empty. If all three addresses are full, the information item is read out of one of these addresses and the input item is stored at that address. A bumping routine is then used to restore the read out information item at an address which is provided by applying the identifier of that item to the three address transform circuits. Retrieval of stored items is realized by applying the identifier of the item to be retrieved to the three address transform circuits. The three memory units are then interrogated to read out the information items at the three addresses generated by the three address transform circuits. Comparison is then carried out to determine which of these items has an identifier which matches the input identifier for the retrieval operation and that information is retrieved from the system.

This invention relates to content addressable memory systems and more particularly to content addressable memory systems using conventional addressable memory devices.

There are at present two ways in which computer memories are generally accessed. In the first, the address at which a desired data unit is stored in the memory is known, and this address is applied to the memory to cause the data unit stored thereat to be read out. In the second, all that is known is an identifier, such as for example a name, for the desired data unit. Memories which are accessed in this latter way are generally referred to as content addressable or associative memories.

Numerous approaches have been taken in designing content addressable memories. Attempts have been made to design special memories for performing this function. These efforts have not, however, been particularly successful in the area of large memories, and the cost of such special memories is considerably higher than that of conventional addressable memories. A brute force approach to the content addressable function is to store a table containing all identifiers in the system with the address at which the data unit corresponding to the identifier is stored. While the search time with this approach may be reduced by providing an index to get the computer into the table at a point near that at which the desired identifier should be stored, numerous memory cycles are still required in order to find a matching table entry, and an additional memory cycle is then required to read out the desired data unit.

Another approach which is frequently employed to accomplish the content addressable function is to apply the input identifier to a one-way transform circuit which converts the input identifier into a memory address. While such a circuit will always generate the same address for a given input identifier, it is possible that such a device will generate the same address for a number of different input identifiers. The reason for this is that, in almost any application of such a memory, the nature of the inputs is not originally known and it is not possible, without having an unreasonably large memory, to provide a unique memory location for all the possible input identifier combinations. It has been determined, in fact, that only about 37% of the addresses generated by such a device are unique, all the other possible addresses which the device is capable of generating either being generated more than once or never being generated at all. In order to assure that it will be possible to store a given unit of input data in the system, the actual packing factor for all but extremely large memories would be somewhat less than this.

Since, for reasons of cost and efficiency, it is undesirable to operate a memory with such a small package factor, the approach which is generally used to obtain the content addressable function is to use the address generated by the transform circuit as a "bucket" address. All entries whose identifiers transform to this bucket address are stored there with their corresponding identifier. A search for a matching identifier is then begun at this bucket address. Several memory cycles are generally required in order to find the entry at the indicated bucket address having the desired identifier. An additional problem with this approach is that a determination has to be initially made as to how large to make each of the buckets (i.e. how many entry positions are going to be provided in each bucket). Since, unless each bucket is made prohibitively large, there is always a danger of overflow, additional bucket positions are generally provided which may be chain addressed to any bucket address which overflows.

From the above, it can be seen that at present there is no available content addressable memory system which is capable of storing large quantities of data at low cost and of also providing access to any stored data unit in a single memory cycle. In order for content addressable memory systems to achieve the throughput capabilities of conventional addressable memory systems, it is necessary that such a system be provided.

It is therefore a primary object of this invention to provide an improved content addressable memory system.

A more specific object of this invention is to provide a content addressable memory system using conventional addressable memory devices.

A still more specific object of this invention is to provide a memory system of the type described above which minimizes the search time for a desired data unit.

Another object of this invention is to provide a memory system of the type described above which is capable of retrieving a desired data unit in one memory cycle of the conventional addressable memory used.

A further object of this invention is to provide a memory system of the type described above which is capable of indicating, in one memory cycle of the conventional addressable memory used, that a desired data unit is not stored in the system.

Another object of this invention is to provide a content addressable memory system using conventional addressable memories which system is capable of functioning even with memories having bad bit positions.

Another object of this invention is to provide a content addressable memory which is capable of retrieving several data units during a single access.

A still further object of this invention is to provide a content addressable memory which is capable of performing several searches simultaneously.

Still another object of this invention is to provide a content addressable memory using conventional addressable memory devices which is completely modular so that capacity may be added to the system as required without necessitating any alteration in the position of already-stored data units or in the addressing of these units.

Another object of this invention is to provide a simple, economical, highly reliable content addressable memory system using conventional addressable memory devices.

In accordance with these objects, this invention provides a conventional addressable memory device having a plurality of individually addressable memory positions. An identifier for a desired data unit is applied to the system and is acted upon by N transform devices, where N is an integer greater than one, which convert the identifier into N memory addresses in the addressable memory device. In preferred embodiments of the invention, the memory device is partitioned, and each of the three addresses generated is in a different portion of the memory device. Data units are stored in the system in a manner such that, if a data unit having the applied identifier is in the system, it is stored at one of the three generated memory address positions. This is accomplished by applying the identifier to the system when a data unit is to be stored, generating the three different addresses peculiar to that identifier, and storing the data unit at one of these three addresses. If all three of these addresses are initially full, a bumping routine is initiated with the input data unit being stored at one of the three generated addresses and one of the remaining addresses peculiar to the displaced identifier is selected to store the displaced data unit. When a data unit is to be utilized, the contents of all three address positions are read out and the identifiers stored at these positions are compared against the applied identifier to determine which of the three contains the desired data unit. This data unit, if it exists, is then either read, written over, or deleted.

The foregoing and other objects, features and advantages of the invention will be apparent from the following more particular description of preferred embodiments of the invention, as illustrated in the accompanying drawings.

Figure 1:
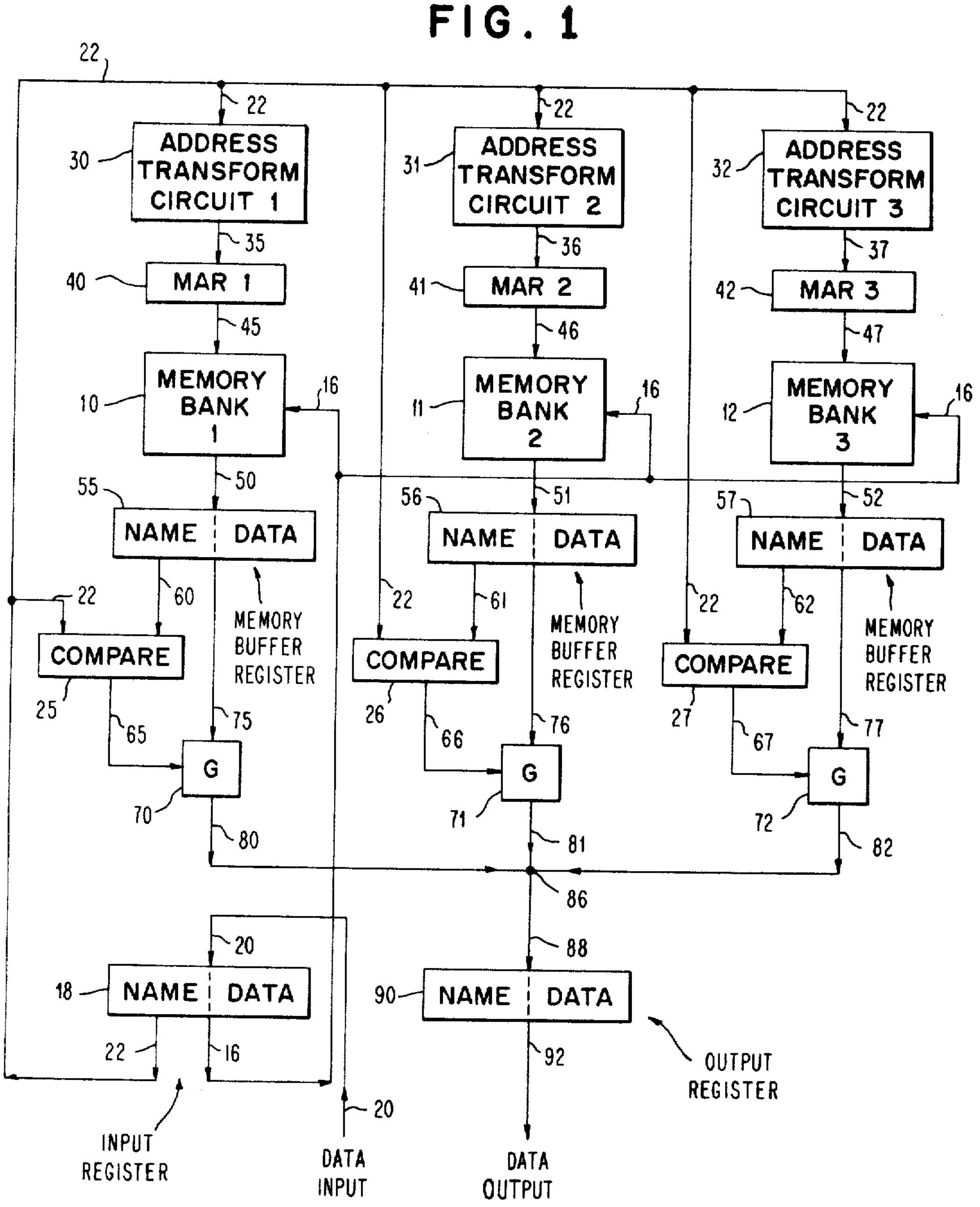
FIG. 1 is a generalized block diagram of a preferred embodiment of the invention.

FIGS. 2A–2F, when combined, form a detailed block diagram of the embodiment of the invention shown in FIG. 1.

Figures 2, 2A:
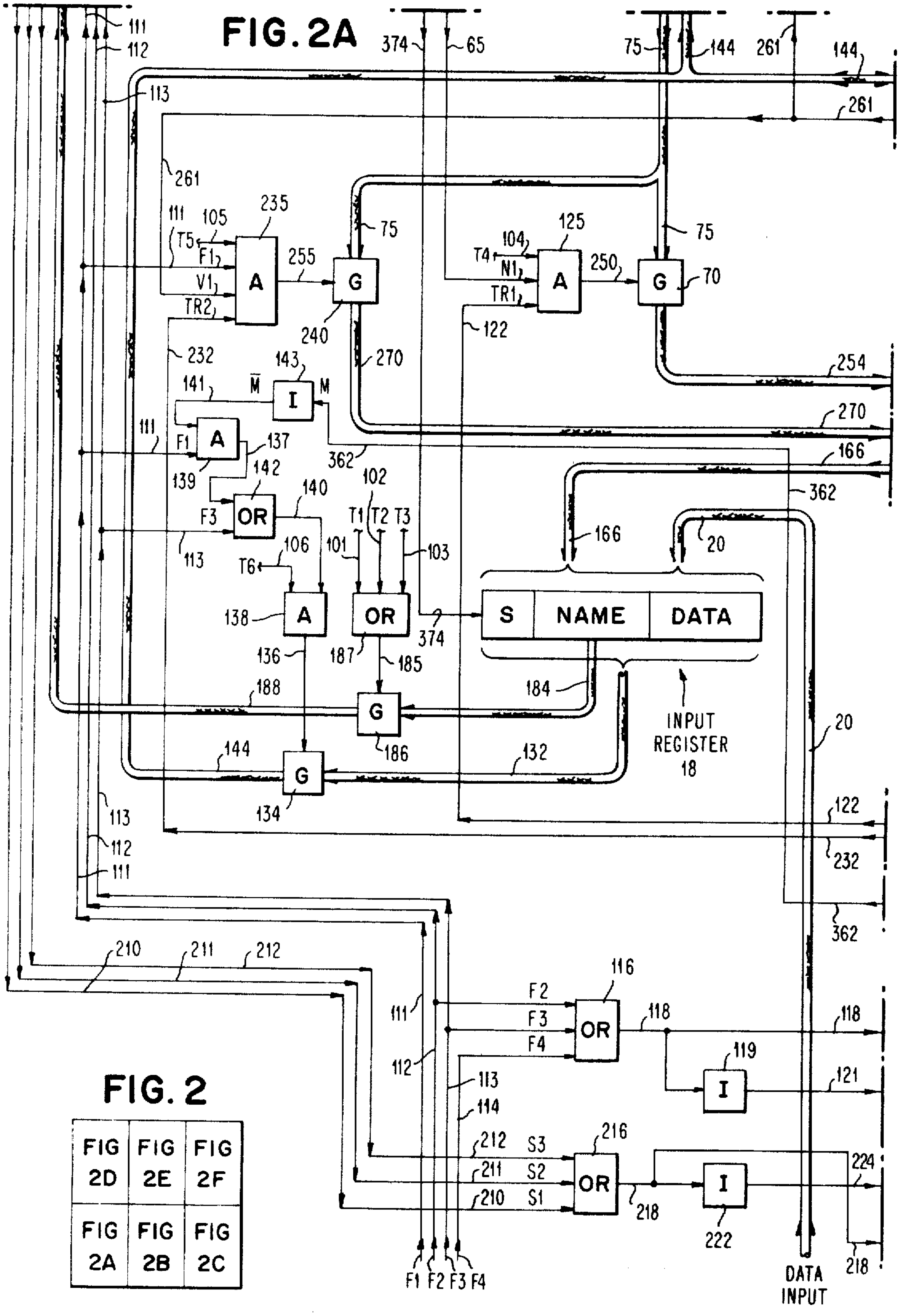
FIG. 2 is a diagram illustrating how
FIGS. 2A–2F are combined to form a detailed block diagram of the embodiment of the invention shown in FIG. 1.
Figure 2B:
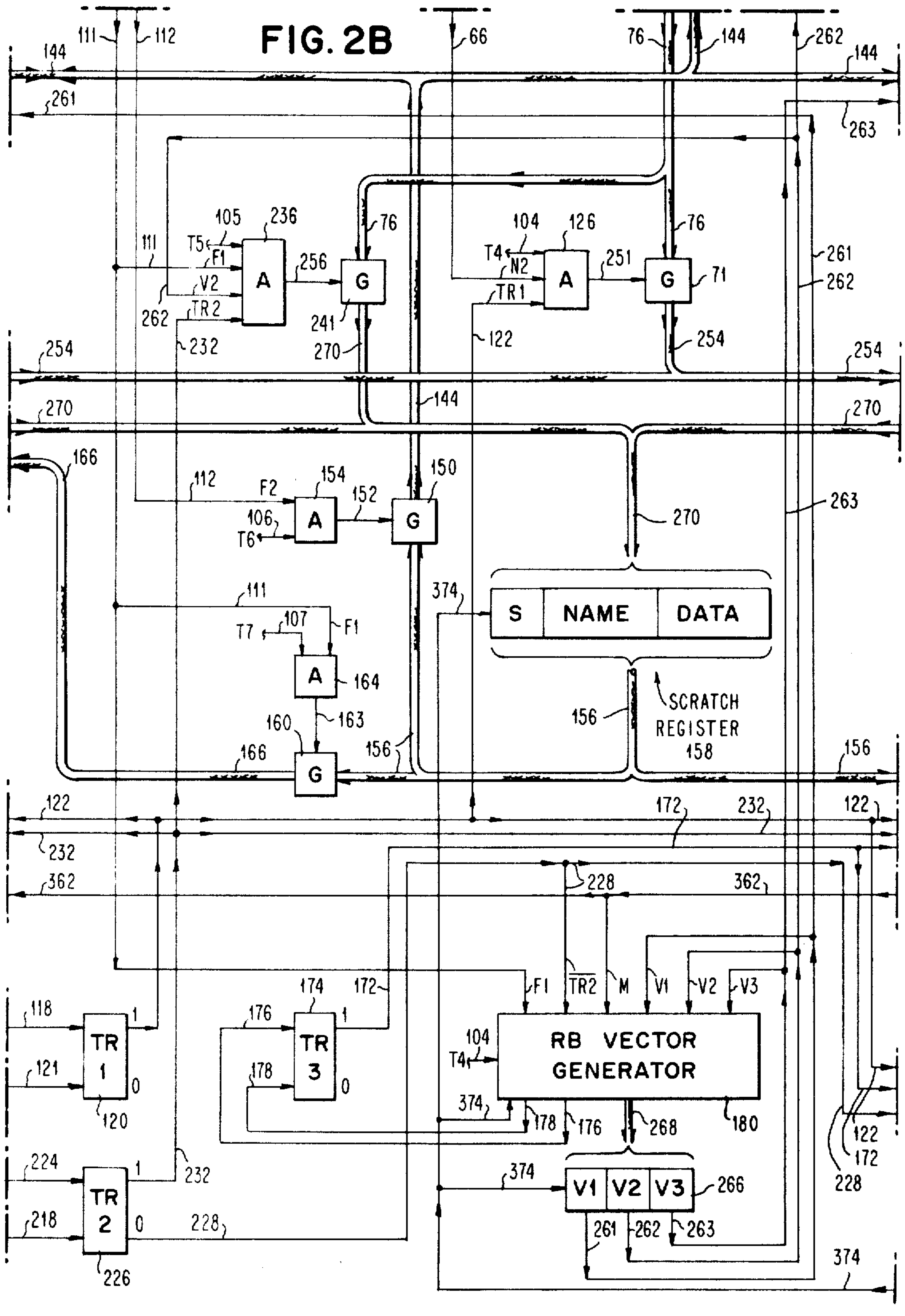
Figure 3:
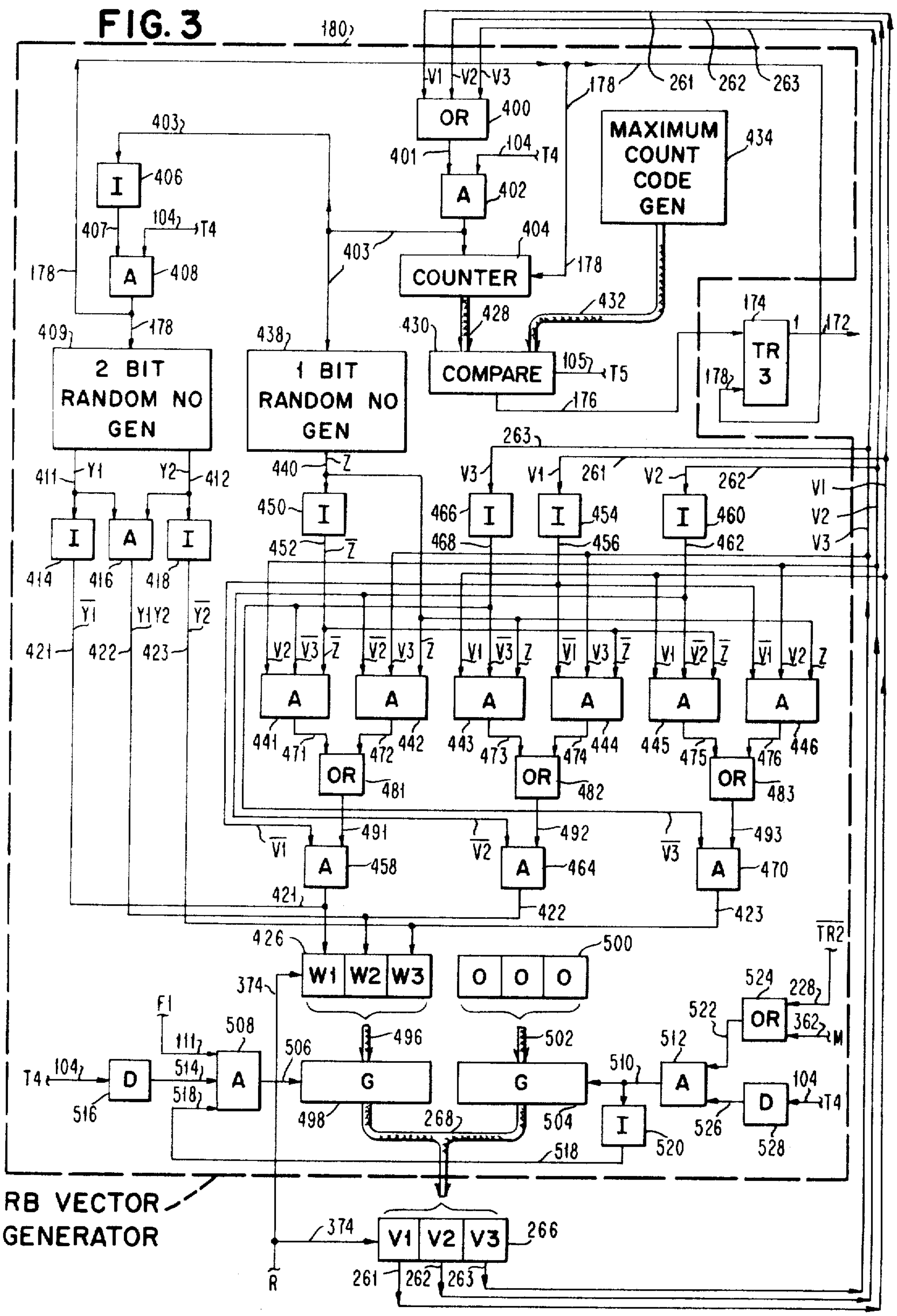

FIG. 3 is a detailed block diagram of the RB vector generator shown in FIG. 2B.

Figure 4:
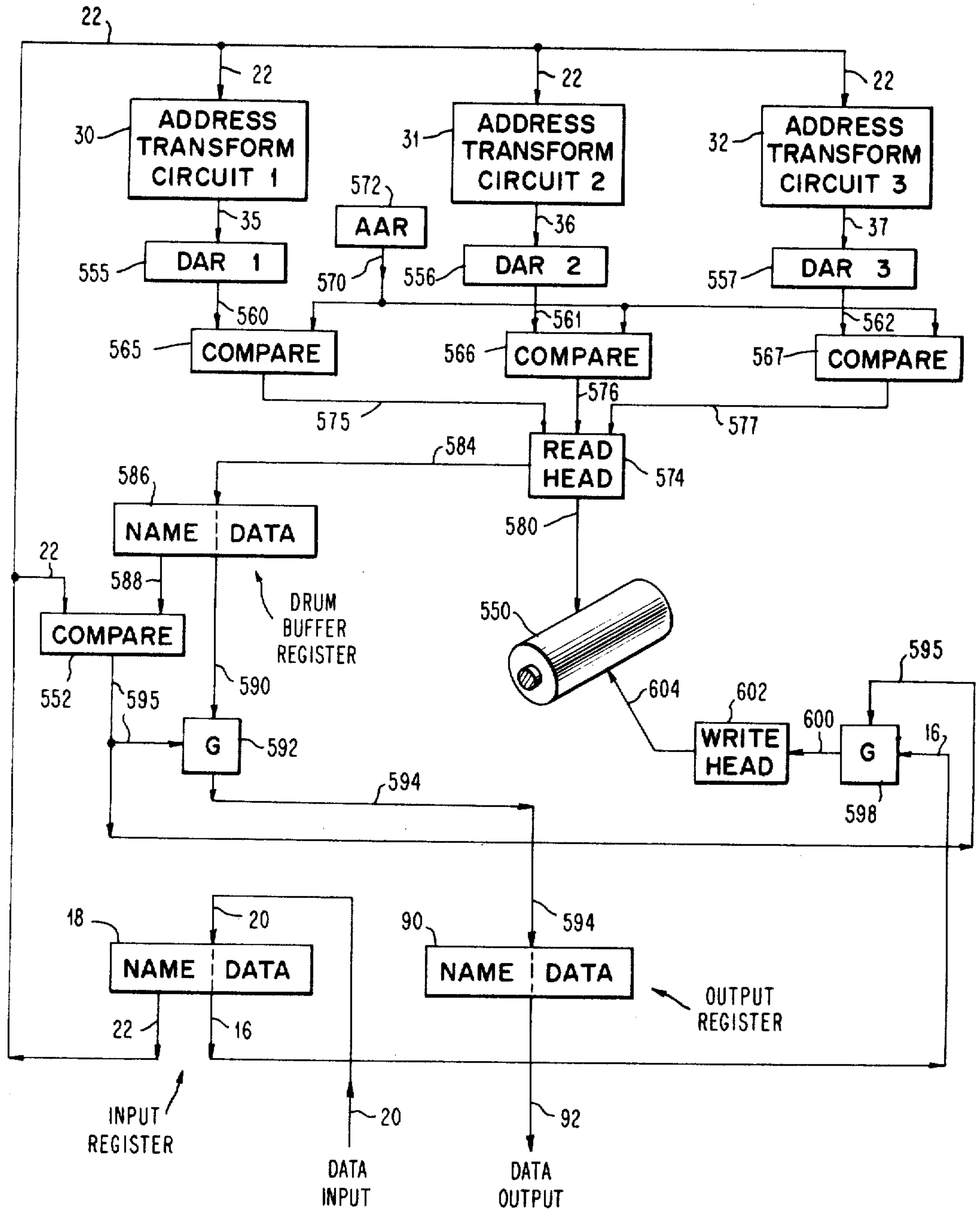

FIG. 4 is a general block diagram of an alternative embodiment of the invention.

*General circuit description*

Referring to FIG. 1, it is seen that it includes three memory banks 10–12. For purposes of the present discussion, these banks will be considered to be magnetic-core matrix memory arrays. While for convenience of illustration, memory banks 10–12 have been shown as being three separate banks, they would in most cases merely be three portions of the same memory array. The data input to memory banks 10–12 is output lines 16 from input register 18. Input register 18 applies both the name (i.e. identifier) for the data unit and the data unit itself to lines 16. The input to input register 18 is lines 20 from a source not shown. The source of lines 20 may be, for example, an input key board or the memory device of a computer.

The name portion of the contents of input register 18 is applied through lines 22 to one input of compare circuits 25–27 and to the date input of address transform circuits 30–32. A circuit suitable for use as the address transform circuits 30–32 is shown in copending application Ser. No. 272,802, now Patent No. 3,311,888, entitled: "Method and Apparatus for Addressing a Memory," filed on behalf of M. Hanan et al. and assigned to the assignee of the instant application. Either a different polynomial is used for each of the address transform circuits or a different address transform scheme as, for example, that shown in copending application Ser. No. 184,032, entitled: "Method and Apparatus for Key Addressing Random Access Memories," filed on behalf of A. D. Lin et al., or copending application Ser. No. 272,707, now Patent No. 3,311,887, entitled: "File Memory System With Key to Address Transformation Apparatus," filed on behalf of S. Muroga, both assigned to the assignee of the instant application, is used for each of the randomizers 30–32 so that each of these randomizers operates under a different set of criteria. This means that for a given name applied to randomizers 30–32, each will generate a different output address. The reason why this is necessary will be apparent later. Output lines 35–37 from randomizers 30–32 respectively are connected as the inputs to memory address registers (MAR's) 40–42. Output lines 45–47 from MAR's 40–42 respectively are connected as the address inputs to memory banks 10–12.

Output lines 50–52 from memory banks 10–12 respectively are connected as the data inputs to memory-buffer registers 55–57 respectively. Output lines 60–62 from the name portions of buffer registers 55–57 respectively are connected as the other set of inputs to compare circuits 25–27. Output lines 65–67 from compare circuits 25–27 respectively are connected as the conditioning inputs to gates 70–72. The information inputs to gates 70–72 are output lines 75–77 from buffer registers 55–57 respectively. Output lines 80–82 from gates 70–72 respectively combine at junction 86 to form lines 88 which are connected as the information input to output buffer register 90. The contents of output buffer register 90 are applied to a suitable output device, which may for example be a memory in a digital computer, through system output lines 92.

*General operation*

The circuit shown in FIG. 1 is capable of performing four basic operations. These operations are: (1) add a name to the system; (2) delete a name from the system; (3) write new data for a name in the system; and (4) read the data for a name in the system.

Assume first that it is desired to add a name to the system. The first step in this operation is to apply the name through lines 20 to the name portion of input buffer register 18. It may or may not be desired to record data with the name at this time so that the data portion of this register may or may not be blank at this time. The name in the name portion of input register 18 is then applied through lines 22 to address transform circuits 30–32. Since each of these circuits generates an address in accordance with a different criteria, three different addresses are generated by these circuits as a result of the name in register 18 being applied to them and these three addresses are applied through lines 35–37 to memory address registers 40–42 respectively. The contents in each of the memory banks 10–12 of the addresses indicated in the memory address registers are then read out through lines 50–52 respectively to memory buffer registers 55–57. A determination is then made in a manner to be described later as to whether any of these address positions are blank. If it is found that the address position in one of the memory banks is vacant, the contents of input buffer register 18 are transferred through lines 16 to the vacant address position, and the name adding operation is complete. If more than one of the accessed memory positions is vacant, the new name and its data are arbitrarily stored in one of the vacant positions, for example the vacant position in the lowest-numbered of the memory banks, and the storing operation is completed.

However, if all of the accessed memory positions have data in them, then a bumping routine must be initiated in order to store the new name in the system. The bumping routine involves randomly selecting one of the three address positions contained in MAR's 40–42, the storing of the new name and data input buffer register 18 in the selected memory position, and transferring (through lines not shown in FIG. 1) the name and data which was in the selected position to input buffer register 18. The contents of the name portion of register 18 are then again applied through lines 22 to address transform circuits 30–32, and the contents of the memory addresses generated as the result of this transform read out into buffer registers 55–57. It is apparent that one of these positions will contain the new name and data which was just stored in the system. If one of the other two positions is empty, the bumped name and data is stored in this position. If neither of these positions is empty, the bumped name and data information contained in input register 18 is stored in a randmoly selected one of the two indicated address positions other than that in which the new name applied to the system is stored, and the name and data which were in that address position are transferred into buffer register 18. This bumping routine is continued until an empty address position is located. It has been determined that with a packing factor of 70% in memory banks 10–12, an average of one bumping cycle is required in order to store a new name in the system. With an 80% packing factor, an average of three bumping cycles are required. An alternative bumping scheme which is faster than the one described above but which requires greater memory capacity in the system will be described later.

For a name-delete, a data-write, or a data-read operation, the name for the data in question is applied through lines 20 to the name portion of input buffer register 18. For a data-write operation, the new data to be stored with the indicated name is applied to the data portion of input buffer register 18 at this time. The name stored in input buffer register 18 is then applied through lines 22 to address transform circuits 30–32, and the three different addresses generated in these circuits applied to memory address registers 40–42 respectively. This causes the contents of these address positions in memory banks 10–12 respectively to be read out into memory buffer registers 55–57. The names in the name portions of buffer registers 55–57 are then applied to one input of compare circuits 25–27 respectively where they are compared with the name stored in input buffer register 18. Due to the manner in which data is stored in memory banks 10–12, only one of these comparisons will be successful causing an output signal on one of the lines 65–67 which is applied to condition the corresponding gate 70–72 to pass the name and data in the associated memory buffer register 55–57 through lines 88 to output buffer register 90.

For a read operation, all that is required is to then apply the information stored in output buffer register 90 through lines 92 to the utilization device (not shown) and to recirculate the contents of buffer registers 55–57 into the appropriate storage positions in memory banks 10–12 respectively. For a name-delete or data-write operation, the contents of output buffer register 90 are generally also transferred to the utilization device but the recirculating operation for the matched-on memory bank is inhibited. For a name-delete operation, all zeros are forced into the address position which contains the matched-on name and for a data-write operation, the new data contained in input register 18 is applied through lines 16 to the address position containing the matched-on name in place of the data in the buffer register 55–57. It can therefore be seen that only one cycle of memory banks 10–12 is required for a name-delete, data-write, or data-read operation. Also, if for some reason the name applied to input register 18 is not in the system, there will be a not-match condition in all of the compare circuits 25–27, enabling this fact to also be ascertained in only one cycle of memory banks 10–12.

*Detailed circuit description*

Figure 2C:
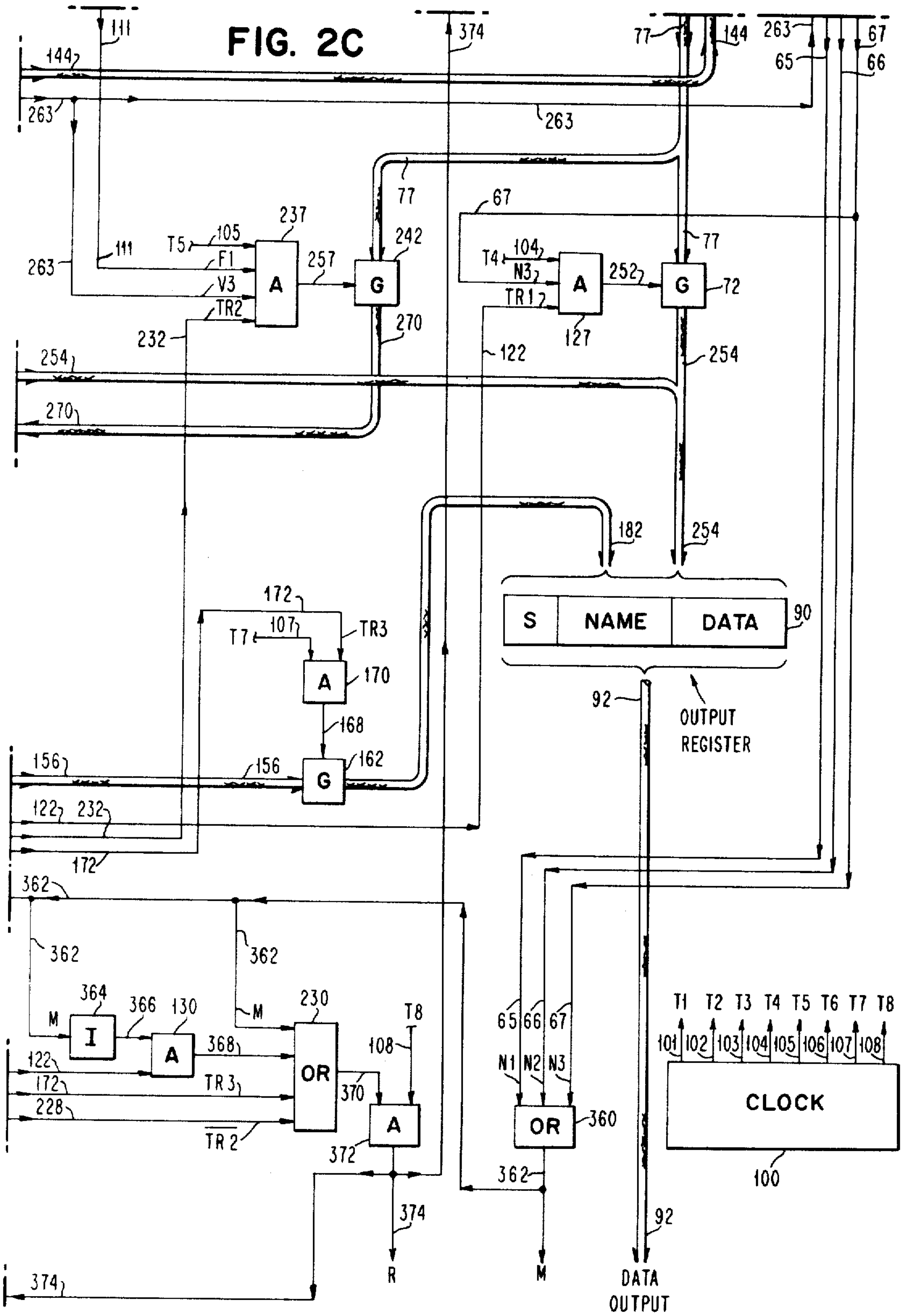

Referring to FIG. 2C, it is seen that the circuit includes a free-running clock 100 having eight output lines 101–108. Lines 101–108 are designated the T1–T8 lines respectively. In order to simplify the drawings, no attempt has been made to connect these lines to each point in the circuit where they are used. Instead, at each of these points an input line appears with the proper letter and number designation. Clock 100 operates in a cyclic fashion with an output signal appearing first on T1 line 101, followed by an output signal on T2 line 202, and so on with a signal appearing again on T1 line 101 when the signal on T8 line 108 terminates. The clock 100 may be any standard circuit which operates in the manner indicated above.

Referring now to FIG. 2A, it is seen that, in addition to input bus 20 which applies name and data and an additional bit to be described later to input register 18, the input source (not shown) also generates signals on four control lines 111–114. These lines are designated the F1–F4 lines respectively. A signal appears on F1 line 111 only when an "add name to the system" operation is being performed. A signal appears on F2 line 102 only when a "delete name from the system" operation is being performed. A signal appears on F3 line 113 only when a "write data" operation is being performed and on F4 line 114 only when a "read data" operation is being performed. The F2, F3, and F4 lines are connected as the three inputs to OR gate 116. Output line 118 from OR gate 116 is connected to the ONE-side input of trigger 1 (TR1) 120 and through inverter 119 and line 121 to the ZERO-side input of this trigger. Trigger 1 is therefore in its ONE state when any operation other than a name-add operation is being performed. Output line 122 from the ONE side of trigger 1 is connected as one input to AND gates 125–127 (FIGS. 2A–2C respectively) and as one input to AND gate 130 (FIG. 2C). The other points in the circuit where the F1–F4 lines are connected will be described later.

Comparing the input register 18 shown in FIG. 2A with that shown in FIG. 1, it is seen that the register in FIG. 2A contains an extra bit in its lowest order position designated the S bit. There is always a bit in this position when a name is applied to input register 18.

Figure 2D:
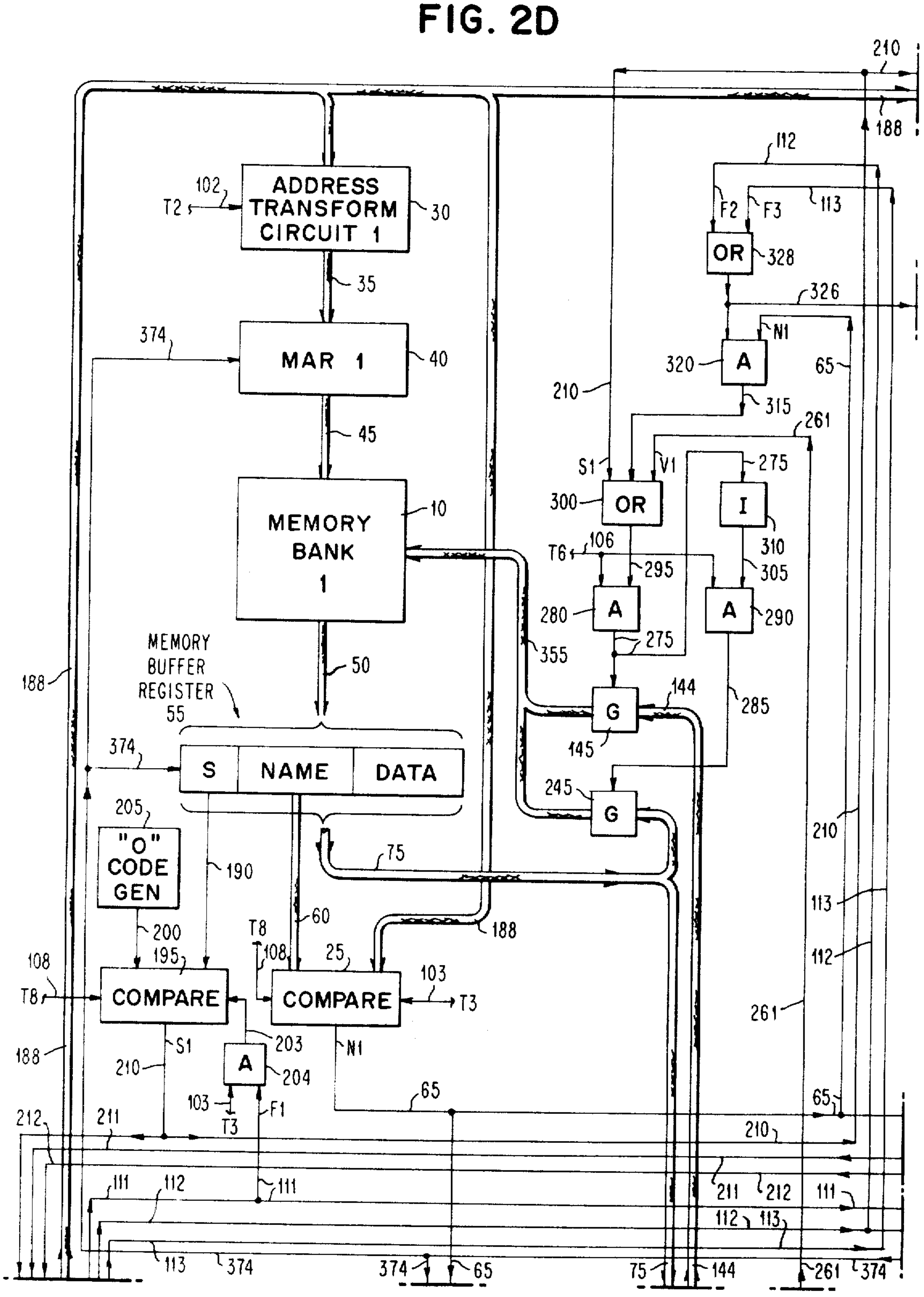
Figure 2E:
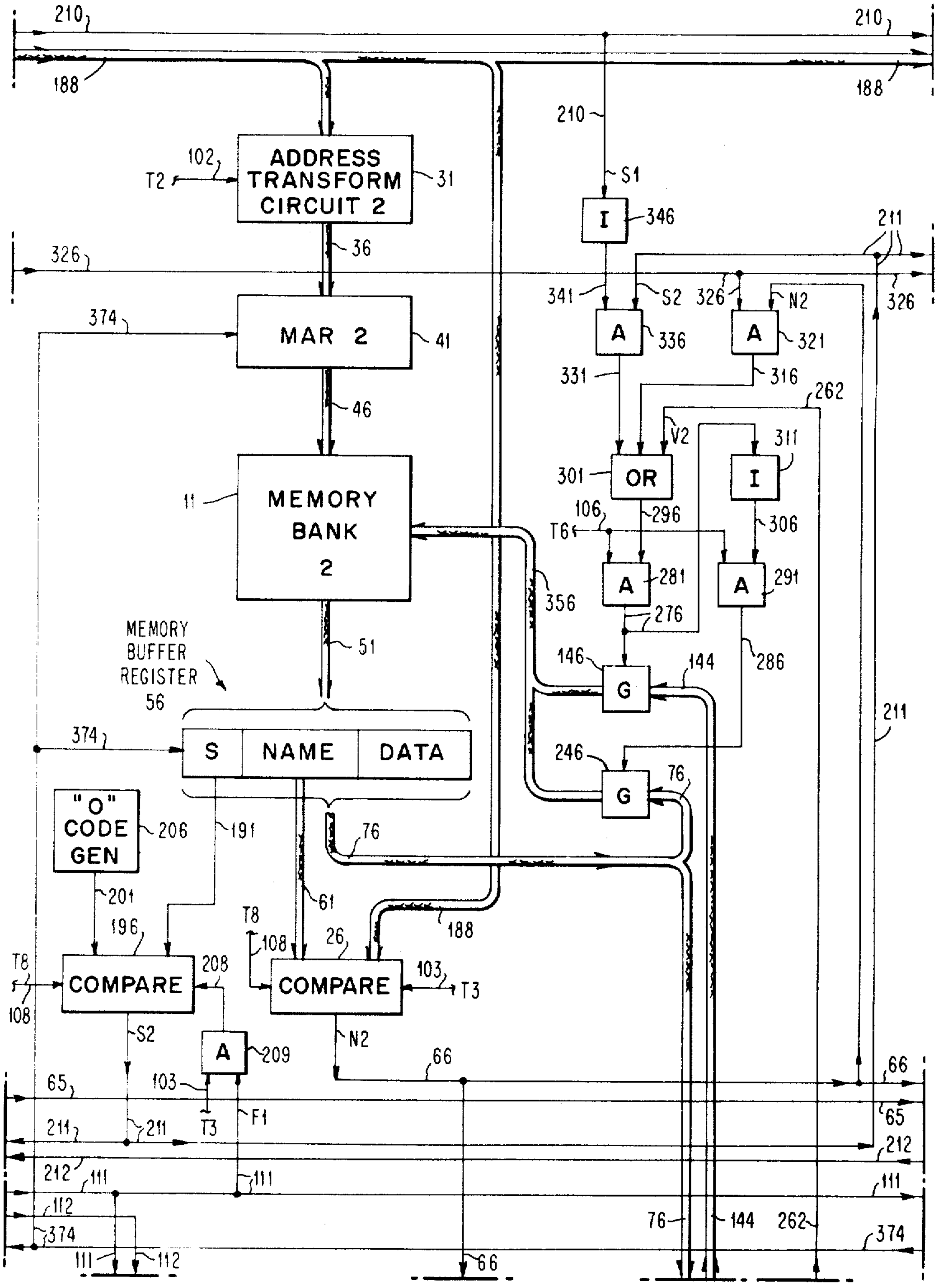
Figure 2F:
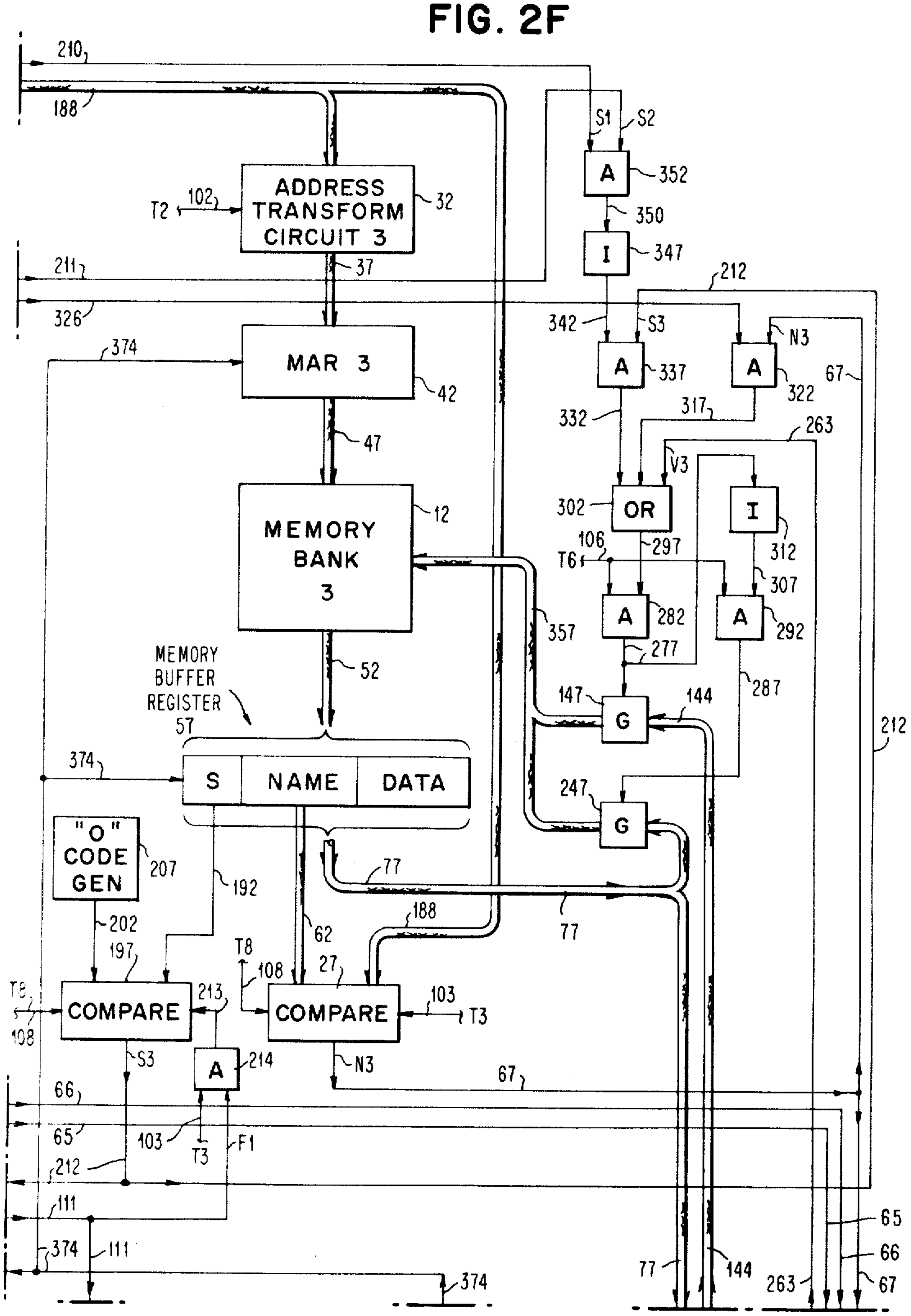

The entire contents of input register 18 are applied through lines 132 to the data input of gate 134. The conditioning input to gate 134 is output line 136 from AND gate 138. The inputs to AND gate 138 are T6 line 106 and output line 140 from OR gate 142. The inputs to OR gate 142 are F3 line 113 and output line 137 from AND gate 139. The inputs to AND gate 139 are F1 line 111 and output line 141 from inverter 143. Output lines 144 from gate 134 form the data inputs to gates 145–147 (FIG. 2D–2F respectively).

It should be noted that lines 144 are also the outputs from gate 150 (FIG. 2B). The conditioning input to gate 150 is output line 152 from AND gate 154. The inputs to AND gate 154 are F2 line 112 and T6 line 106. The information inputs to gate 150 are output lines 156 from scratch register 158. Lines 156 are also connected as the data inputs to gates 160 (FIG. 2B) and 162 (FIG. 2C). The conditioning input to gate 160 is output line 163 from AND gate 164. The inputs to AND gate 164 are T7 line 107 and F1 line 111. Output lines 166 from gate 160 are connected as the other set of inputs to input register 18. The ORing function between the two sets of inputs applied to it is performed inside input register 18. The conditioning input to gate 162 (FIG. 2C) is output line 168 from AND gate 170. The inputs to AND gate 170 are T7 line 107 and output line 172 from trigger 3 (TR3)

174 (FIG. 2B). The set and reset inputs to trigger 3 are output lines 176 and 178 respectively from random-bump (RB)-vector generator 180. RB-vector generator 180 will be described in more detail later. Output lines 182 from gate 162 are connected as one set of inputs to output register 90.

Referring again to FIG. 2A, it is seen that output lines 184 from the name portion of input register 18 are connected as the information inputs to gate 186. The conditioning input to gate 186 is output line 185 from OR gate 187. The inputs to OR gate 187 are T1–T3 lines 101–103. Output lines 188 from gate 186 are connected as the inputs to address transform circuits 30–32 (FIG. 2D–2F respectively) and as one set of inputs to compare circuits 25–27 (FIG. 2D–2F respectively). The energizing input to address transform circuits 30–32 is T2 line 102. Output lines 35–37 from address transform circuits 30–32 respectively are connected as the inputs to memory address registers 40–42 respectively. Output lines 45–47 from memory address registers 40–42 are connected as the address inputs to memory banks 10–12 respectively. The address transform circuits, memory address registers, and memory banks shown in FIGS. 2D–2F bear the same numbers as, and are of the same type as, the corresponding elements shown in FIG. 1 and described previously.

Output lines 50–52 (FIGS. 2D–2F respectively) from memory banks 10–12 respectively are connected as the inputs to memory buffer registers 55–57. It is noted that each of the buffer registers 55–57 also includes an S bit position. This bit position is 0 when the address position read into the register is empty and contains a bit when there is a name stored at the read-out address position. The contents of the S bit position of registers 55–57 are applied through lines 190–192 respectively to one input of compare circuits 195–197. The other inputs to compare circuits 195–197 are output lines 200–202 respectively from 0-bit code generators 205–207. The compare condition inputs to compare circuits 195–197 are output line 203 from AND gate 204, output line 208 from AND gate 209, and output line 213 from AND gate 214 respectively. The inputs to AND gates 204, 209, and 214 are T3 line 103 and F1 line 111. The reset input to each of the compare circuits is T8 line 108. A signal appears on an output line 210–212 from a compare circuit 195–197 respectively when there is a successful comparison in the compare circuit, or, in other words, when the address position applied to the corresponding buffer register 55–57 is blank. The lines 210–212 are individually designated the S1–S3 lines respectively. The compare circuits are of a latching type such that once a signal appears on one of the S lines, it persists until the compare circuit is reset. The S1–S3 lines are connected as the inputs to OR gate 216 (FIG. 2A). The other points in the circuit which these lines are connected to will be described later. Output line 218 from OR gate 216 is connected to the ZERO-side input of trigger 2 (TR2) 226 (FIG. 2B) and through inverter 222 and line 224 to the ONE-side input of this trigger. Output line 228 from the ZERO side of trigger 2 is connected as one input to RB-vector generator 180 and as one input to OR gate 230 (FIG. 2C). A second input to OR gate 230 is beforementioned output line 172 from trigger 3 (FIG. 2B). Output line 232 from the ONE side of trigger 2 is connected as one input to AND gates 235–237 (FIGS. 2A–2C respectively).

Output lines 60–62 from the name field of memory buffer registers 55–57 (FIGS. 2D–2F respectively) are connected as the second set of information inputs to compare circuits 25–27 respectively. The activating input to compare circuits 25–27 is T3 line 103 and the reset input to these compare circuits is T8 line 108. A signal appears on an output line 65–67 when the inputs applied to the corresponding compare circuit 25–27 respectively are equal. Lines 65–67 are designated the N1–N3 lines respectively. Compare circuits 25–27 are also of a latching type so that, once a signal appears on an N line, it persists until the compare circuit is reset. The points at which these lines are connected in the circuit will be described later.

Output lines 75 from buffer register 55 (FIG. 2D) are connected as the information inputs to gates 70 (FIG. 2A), 240 and 245 (FIG. 2D). Output lines 76 from buffer register 56 are connected as the data inputs to gates 71 (FIG. 2B), 241 and 246 (FIG. 2E). Output lines 77 from buffer register 57 are connected as the data inputs to gates 72 (FIG. 2C), 242 and 247 (FIG. 2F). The conditioning inputs to gates 70–72 (FIGS. 2A–2C respectively) are output lines 250–252 from AND gates 125–127 respectively. Two inputs to AND gates 125–127 are T4 line 104 and output line 122 from the ONE side of trigger 1 (FIG. 2B). The third input to AND gate 125 is N1 line 65; the third input to AND gate 126 is N2 line 66; and the third input to AND gate 127 is N3 line 67. The outputs from gates 70–72 merge to form bus 254 which is connected as the other set of inputs to output register 90. Output register 90 is capable of performing the required ORing function on its two sets of inputs.

The conditioning inputs to gates 240–242 (FIGS. 2A–2C respectively) are output lines 255–257 respectively from AND gates 235–237. Three inputs to AND gates 235–237 are T5 line 105, F1 line 111, and output line 232 from the ONE side of trigger 2 (FIG. 2B). The fourth input to AND gate 235 is V1 line 261; the fourth input to AND gate 236 is V2 line 262; and the fourth input to AND gate 237 is V3 line 263. V1 line 261, V2 line 262, and V3 line 263 are the outputs from the first, second, and third bit positions respectively of V register 266 (FIG. 2B). These three lines are also connected as inputs to RB-vector generator 180 and to other points in the circuit to be described later. The input to V register 266 is output lines 268 from RB-vector generator 180. The output lines from gates 240–242 merge to form bus 270 which is connected as the input to scratch register 158 (FIG. 2B).

The conditioning inputs to gates 145–147 (FIGS. 2D–2F respectively) are output lines 275–277 from AND gates 280–282 respectively, and the conditioning inputs to gates 245–247 are output lines 285–287 from AND gates 290–292. One input to AND gates 280–282 is output lines 295–297 respectively from OR gates 300–302 and one input to AND gates 290–292 is output lines 305–307 respectively from inverters 310–312. The inputs to inverters 310–312 are beforementioned lines 275–277 respectively. The inputs to OR gate 300 are S1 line 210, V1 line 261, and output line 315 from AND gate 320. The inputs to AND gate 320 are N1 line 65 and output line 326 from OR gate 328. The inputs to OR gate 328 are F2 line 112 and F3 line 113. The inputs to OR gate 301 (FIG. 2E) are the V2 line 262, output line 316 from AND gate 321, and output line 331 from AND gate 336. The inputs to AND gate 321 are N2 line 66 and beforementioned output line 326 from OR gate 328 (FIG. 2D). The inputs to AND gate 336 are S2 line 211 and output line 341 from inverter 346. The input to inverter 346 is S1 line 210. The inputs to OR gate 302 (FIG. 2F) are V3 line 263, output line 317 from AND gate 322, and output line 332 from AND gate 337. The inputs to AND gate 322 are N3 line 67 and beforementioned output line 326 from OR gate 328 (FIG. 2D). The inputs to AND gate 337 are S3 line 212 and output line 342 from inverter 347. The input to inverter 347 is output line 350 from AND gate 352. The inputs to AND gate 352 are S1 line 210 and S2 line 211.

The second input to AND gates 280–282 (FIGS. 2D–2F respectively) and 290–292 is T6 line 106. The output lines from gates 145 and 245 merge to form bus 355. Similarly, the output lines from gates 146 and 246 merge to form bus 356 and the output lines from gates 147 and 247 merge to form bus 357. Buses 355–357 are connected as the data inputs to memory banks 10–12 respectively.

Referring now to FIG. 2C, it is seen that the N1–N3 lines 65–67 are connected as the inputs to OR gate 360. OR gate 360 therefore generates an output signal on M line 362 when a matching name has been found in the system. Line 362 is connected to the external control circuitry (not shown), as one input to OR gate 230, as the input to inverter 364, as another input to RB-vector generator 180 (FIG. 2B) and as the input to inverter 143 (FIG. 2A). Output line 366 from inverter 364 is connected as the second input to AND gate 130. Output line 368 from AND gate 130 is connected as the final input to OR gate 230. Output line 370 from OR gate 230 is connected as one input to AND gate 372, the other input to this AND gate being T8 line 108. An output signal appears on R line 374 from AND gate 372 when the function being performed has been completed. For functions F2, F3, and F4 (i.e. a name-delete, data-write, or data-read operation) this is after one cycle of clock 100. The signal on R line 374 is applied to the external control circuitry (not shown) and as the reset input to all of the registers in the circuit except output register 90.

Referring now to FIG. 2B, it is seen that in addition to the inputs already described, T4 line 104 and F1 line 111 are also connected as inputs to RB-vector generator 180. FIG. 3 shows the circuitry inside RB-vector generator 180 in more detail. Referring to this figure, it is seen that output lines 261–263 from V register 266 are connected as the inputs to OR gate 400. Therefore, if there is a bit in the V register, OR gate 400 generates an output signal on line 401 which is applied as one input to AND gate 402. The other input to AND gate 402 is T4 line 104. Output line 403 from AND gate 402 is connected as the increment input to counter 404, as the input to inverter 406, and as the start input to 1-bit random number generator 438. A signal therefore appears on output line 407 from inverter 406 when V register 266 is empty. Line 407 is connected as one input to AND gate 408, the other input to this AND gate being T4 line 104. Output line 178 from AND gate 408 is connected as the reset input to counter 404 and trigger 3 174 (also see FIG. 2B).

Line 178 is also connected as the triggering input to 2-bit random number generator 409. Circuit 409 may, for example, be a 2-bit counter which, when it is energized by a signal on line 178 gates its contents onto Y1 and Y2 lines 411 and 412 and is itself incremented. The circuitry inside generator 409 is constrained such that there is always an output on at least one of the lines 411 and 412. Line 411 is connected as the input to inverter 414 and as one input to AND gate 416. Line 412 is connected as the other input to AND gate 416 and as the input to inverter 418. Output lines 421–423 from inverter 414, AND gate 416, and inverter 418 respectively are connected as the inputs to the first, second, and third bit positions respectively of W register 426.

The contents of counter 404 are applied through lines 328 to one input of compare circuit 430. The other input to compare circuit 430 is output lines 432 from maximum-count-code generator 434. As will be seen later, counter 404 is incremented each time a random-bump cycle is performed during an "add a new name to the system" operation (F1). In order to prevent the system from being tied up indefinitely, an arbitrary number of random bump cycles are permitted before a determination is made that a new name cannot be stored in the system. This is the number stored in maximum-count-code generator 434. The compare condition input to compare circuit 430 is T5 line 105. If the inputs applied to compare circuit 430 are equal, the compare circuit generates an output signal on line 176 which is applied to set trigger 3 to its ONE state.

As indicated previously, a signal on line 403 is applied to activate 1-bit random number generator 438. Generator 438 may merely be a 1-bit register which has its output gated onto Z line 440 when an energizing signal is applied to line 403 and then has its contents either altered or left alone in a random pattern. Z line 440 is connected directly as one input to AND gates 442, 443, and 446 and through inverter 450 and line 452 as one input to AND gates 441, 444, and 445. V1 line 261 is connected as a second input to AND gate 443 and 45, V2 line 262 as a second input to AND gates 41 and 446, and V3 line 263 as a second input to AND gates 442 and 444. V1 line 261 is also connected through inverter 454 and line 456 as a second input to AND gates 444 and 446 and as one input to AND gate 458. V2 line 262 is also connected through inverter 460 and line 462 as a second input to AND gates 442 and 445 and as one point to AND gate 464. V3 line 263 is also connected through inverter 466 and line 468 as a second input to AND gates 441 and 443 and as one input to AND gate 470. Output lines 471 and 472 from AND gates 441 and 442 respectively are connected as the inputs to OR gate 481. Output lines 473 and 474 from AND gates 443 and 444 respectively are connected as the inputs to OR gate 482. Output lines 475 and 476 from AND gates 445 and 446 respectively are connected as the inputs to OR gate 483. Output lines 491–493 from OR gates 481–483 respectively are connected as a second input to AND 458, 464 and 470 respectively. Previously described lines 421—423 are also the outputs from AND gates 458, 464, and 470 respectively. These lines are connected as the inputs to W register 426.

Output lines 496 from W register 426 are connected as the information inputs to gate 498. Register 500 is preset to contain all zeros. Output lines 502 from register 500 are connected as the information inputs to gate 504. The conditioning inputs to gates 498 and 504 are output lines 506 from AND gate 508 and 510 from AND gate 512 respectively. The inputs to AND gate 508 are F1 line 111 (FIG. 2A), output line 514 from short delay 516, and output line 518 from inverter 520. The input to delay 514 is T4 line 104 (FIG. 2C), and the input to inverter 520 is beforementioned line 510. The inputs to AND gate 512 are output line 522 from OR gate 524 and output line 526 from short delay 528. The inputs to OR gate 524 are output line 228 from the ZERO side of trigger 2 (FIG. 2B) and output line 362 from OR gate 360 (FIG. 2C). The input to delay 528 is T4 line 104. The outputs from gates 498 and 504 merge to form input lines 268 to V register 266. Output line 374 from AND gate 372 (FIG. 2C) is connected as the reset input to registers 266 and 426.

*Detailed description of operation*

Assume initially that all registers and compare circuits in the system are reset and that it is desired to add a new name to the system. Under these conditions, triggers 1 and 3 (FIG. 2B) are in their ZERO state and trigger 2 is in its ONE state. A signal is then applied to F1 line 111 and an entry comprising a bit in the S bit position and the new name is aplied through input data bus 20 to input register 18 (FIG. 2A.) Data associated with the new name may or may not be included with the entry which is used to add a new name to the system. At T1 time, following the transfer of an entry into input register 18, gate 185 (FIG. 2A) is conditioned to pass the name portion of the entry in register 18 through lines 188 to address transform circuits 30–32 (FIGS. 2D–2F respectively). At T2 time, signals are applied through lines 102 to activate the address transform circuits, causing each of these circuits to generate a different address, which addresses are applied through lines 35–37 to memory address registers 40–42 respectively. The addresses stored in memory address registers 40–42 are applied through lines 45–47 to the address inputs to memory banks 10–12 respectively causing the contents of the indicated address positions in each of these memory banks to be read out through lines 50–52 to memory buffer registers 55–57.

It should be pointed out that, since there is a signal on line 111 at this time and no signal on S lines 210–212, none of the inputs to either OR gate 116 or 216 (FIG.

2A) are present and inverters 119 and 222 are therefore generating output signals on lines 121 and 224 respectively at this time causing trigger 1 to be in its ZERO state and and trigger 2 to be in its ONE state. At T3 time, AND gates 204, 209 and 214 (FIGS. 2D–2F respectively) are fully conditioned to generate output signals on lines 203, 208 and 213 respectively which signals are applied to energize compare circuits 195–197. This causes a determination to be made as to whether the S bits stored in memory buffer registers 55–57 are 0. It will be remembered that if any of these S bits are 0, it means that the corresponding memory position is empty. At the same time that the S bit position in each of the memory buffer registers is being tested, the name field in each of these registers is being applied through the associated lines 60–62 to the corresponding compare circuit 25–27. The signal on T3 line 103 allows the inputs to compare circuits 25–27 the second input to each of the compare circuits being the name contained in input register 18, to be compared. If one of these comparisons is successful, meaning that the name which is to be added to the system is in fact already in the system, then the latch in one of the compare circuits 25–27 is set causing an output signal on one of N1–N3 lines 65–67. A signal on one of these lines is applied to OR gate 360 (FIG. 2C) causing an output signal on match line 362. Similarly, if one of the comparisons in comparators 195–197 is successful, indicating that there is a blank position in the system at which the new entry may be stored, the latch in that comparator is set causing an output signal on an S1–S3 line 210–212. A signal on one of the S1–S3 *lines* is applied through OR gate 216 (FIG. 2A) to line 218 causing trigger 2 to be reset to its ZERO state. This causes the signal on ONE-side output line 232 to terminate and a signal to be applied to ZERO-side output line 228.

Referring now to FIG. 3, it is seen that at T4 time, a signal is applied to one input of AND gate 402. If, at this time, there is a bit in V register 266, this AND gate is fully conditioned to generate an output signal on line 403. However, it was initially assumed that all registers, including the V register, were reset. Therefore, at this time, there is no signal on line 403 and inverter 406 is therefore generating an output signal on line 407 which is applied to fully condition AND gate 408 to generate an output signal on line 178. The signal on line 178 is applied to reset counter 404 to a count of 0, to reset trigger 3 to its ZERO state, and to energize 2-bit random number generator 409 to generate an output on lines 411 and 412 and to change its setting in accordance with some predetermined criteria. As indicated previously, generator 409 is wired such that it always generates either an output on line 411 or an output on line 412 or an output on both lines. Elements 414, 416, and 418 combine to form a decoder circuit which converts the outputs on lines 411 and 412 into a 1 out of 3 code on lines 421–423. For example, if circuit 409 generates an output signal on line 412 but no output signal on line 411, there is a signal on line 421 from inverter 414 and no signal on line 422 and 423. The signal on line 421 is stored in the first position of W register 426.

The signal on T4 line 104 is also applied to short delays 516 and 528. The duration of these delays is sufficient to permit the desired 1 out of 3 code to be set up in W register 426 in a manner previously described. The outputs from delays 516 and 528 are applied as one of the conditioning inputs to AND gates 508 and 512 respectively. If one of the comparisons performed during T3 time was successful, indicating either that one of the three addresses generated is that of a blank position so that the new name may be stored in this position, or that the name is already in the system so that there is no need to add it to the system, then a random bump routine need not be initiated. As indicated previously, under these conditions, there will either be a signal on ZERO-side output line 228 from trigger 2 (FIG. 2B) or on match line 362 (FIG. 2C). From FIG. 3, it is seen that these two lines are the inputs to OR gate 524, the output line 522 from which is applied as the other conditioning input to AND gate 512. AND gate 512 is therefore conditioned at this time only if there is no need to perform a random bump operation. Under these conditions, gate 504 is conditioned to pass all zeros into V register 266. If, on the other hand, the circuit is performing an "add name to the system" operation and neither of the comparisons performed during T3 time was successful, indicating that a random bump routine must be initiated, then all inputs to AND gate 508 are present causing an output signal on line 506 which conditions gate 498 to pass the 1-out-of-3 code stored in W register 426 into V register 266. For the decode operation previously described, this would mean that there would be a bit in the V1 position of register 266 and no bit in the V2 and V3 positions of this register. This results in a signal on V1 line 261 and no signal on V2 and V3 lines 262 and 263.

At T5 time, the signal on line 105 is applied as one conditioning input to AND gates 235–237 (FIGS. 2A–2C respectively). Since an "add name to the system" operation is being performed, there is a signal on F1 line 111 which is applied as a second conditioning input to each of these AND gates. If no vacant positions were found in the memory banks during T3 time, there is no signal on any of the S lines and trigger 2 is in its ONE state causing an output signal on line 232 which is applied as a third input to each of these AND gates. The fourth input to these AND gates is derived from one of the V lines 261–263. Since it has been assumed that there is a signal on V1 line 261 at this time, AND gate 235 is fully conditioned to generate an output signal on line 255 which conditions gate 240 to pass the entry contained in memory buffer register 55 (FIG. 2D) through lines 270 to scratch register 158 (FIG. 2B). It can be seen that if one of the comparisons performed at T3 time had been successful, eliminating the need for a random bump operation, there would have been no signal on any of the V lines and the transfer of an entry to scratch register 158 would be inhibited.

At T6 time, the write portion of the read-write memory cycle of memory banks 10–12 is being performed. Since, for the present discussion, it is function 1 which is being performed, one input to AND gate 139 (FIG. 2A) is present. If a matching entry was not found in the system at T3 time, this AND gate is fully conditioned and at T6 time AND gate 138 is conditioned to generate an output signal on line 136 which conditions gate 134 to pass the new entry in input register 18 through lines 144 to the data input of gates 145–147 (FIGS. 2D–2F respectively). At this same time, the entries stored in memory buffer registers 55–57 are applied to the data inputs of gates 245–247 respectively. If, at T3 time, it was found that one of the accessed memory positions is empty, a signal would now be present on the corresponding S line 210–212. Referring to FIG. 2D, it is seen that if there is a signal on S1 line 210, AND gate 280 is conditioned at T6 time to generate an output signal on line 275 which is applied to condition gate 145 to store the new entry in the accessed memory position in memory bank 10. If there is a single on S2 line 211 and no signal on S1 line 210, AND gate 281 (FIG. 2E) is fully conditioned at T6 time to generate an output signal on line 276 which is applied to condition gate 146 to store the new entry in the accessed position in memory bank 11. It can be seen that if there are vacant positions in both memory bank 10 and memory bank 11, the new entry will be stored in the empty position in memory bank 10. Similarly, if there is a signal on S3 line 212 and no signal on S1 and S2 lines 210 and 211, AND gate 282 (FIG. 2F) is fully conditioned at T6 time to generate an output signal on line 277 which is applied to condition gate 147 to pass the new entry into the accessed position in memory bank 12. It is therefore seen that the new entry is stored in the lowest-numbered memory bank in which there is an empty accessed position.

If, at T3 time, it had been found that the name in the entry in input register 18 was already in the system, there would be a signal on one of the N lines 65–67 and therefore on M line 362 (FIG. 2C). Since the name is already in the system, there is no need to apply it to the system at this time. The signal on M line 362 at this time is therefore applied to inverter 143 (FIG. 2A), thereby preventing gate 134 fom being conditioned to pass the entry in input register 18 to gates 145–147 (FIGS. 2D–2F). The name in the input register can therefore not be added to the system even if one of the accessed memory positions is blank. This assures that a given name will appear in only one memory position in the system. If data is included with the new name, the occurrence of a signal on M line 362 when an F1 operation is being performed tells the input-output device (not shown) that the new data has not been entered and that it shoud be reapplied to the system with an F3 (data write) signal on line 113.

If, at T3 time, it was found that none of the accessed memory positions were empty and it was further found that the name applied to input register 18 was not already in the system, there would be, for reasons previously described, a signal on one of the V lines 261–263 at this time. For purposes of illustration, it has been assumed that there is a signal on V1 line 261. This signal is applied through OR gate 300 (FIG. 2D) to condition AND gate 280 at T6 time to generate an output signal on line 275 which conditions gate 145 to pass the new entry into the accessed position in memory bank 10.

It is seen that the inverted outputs from AND gates 280–282 are applied to condition AND gates 290–292 respectively at T6 time. Therefore, for any of the memory banks in which the new entry is not to be stored, the corresponding one of the AND gates 290–292 is conditioned to generate an output signal on its output line 285–287 which is applied to condition the corresponding gate 245–247 to recirculate the entry in memory buffer register 55–57 into the accessed position in the memory bank. Non-destructive readout of memory banks 10–12 is in this way effected. The one condition where recirculation does not occur is where the new name is already in the system and one of the other accessed positions is empty. The empty position does not recirculate. However, since this position is empty, no information is lost.

When the circuit is performing an "add a new name to the system" operation, at T7 time, all inputs to AND gate 164 (FIG. 2B) are present causing an output signal on line 163 which conditions gate 160 to pass the bumped entry in scratch register 158 through lines 166 to input register 18.

If, at T3 time of the above described operation, one of the two comparisons made was successful, there is a signal on either line 228 or 362 at T8 time which is applied through OR gate 230 (FIG. 2C) and line 370 to condition AND gate 372 to generate an output signal on line 374 which is applied to reset all of the registers in the system and to inform the input source (not shown) that the system is ready for a new instruction. If, on the other hand, the new entry was inserted into the system only by bumping an old entry, which is at this time stored in input register 18, the system still has the bumped entry to store and is therefore not ready for a new instruction. Under these conditions, no signal is applied to reset line 374. In either event, at T8 time, a signal is applied to line 108 to reset the latches in compare circuits 25–27 (FIGS. 2D–2F respectively) and 195–197.

For the sake of illustration, assume that neither of the comparisons a T3 time was successful so that a bumping operation was performed and there is now a bumped entry in input register 18. Assume further that this entry was taken from the memory bank 10. The situation now existing is identical to that which existed when the new entry was applied to the system with one exception. When the name now in input register 18 is applied to address transform circuits 30–32, the address generated by circuit 30 will be the address at which the new entry was stored. Since the pumped entry cannot be stored at this address, there are only two rather than three address positions at which the bumped entry may be stored.

As before, at T3 time, comparisons are made in compare circuits 25–27 and 195–197 to determine if the name in input register 18 is already in the system and to determine if any of the accessed memory positions are empty. Since the name in input register 18 was just removed from the system, the former of these tests should always give a negative result.

Referring now to FIG. 3 and remembering that, since none of the registers were reset at the end of the preceding clock cycle, there is a bit in the lowest order position of th V register 266, it is seen that the resulting signal on line 261 is applied through OR gate 400 to condition AND gate 402 to generate a signal on line 403 at T4 time. The signal on line 403 is applied to increment counter 404 and to energize 1-bit random number generator 438 to generate either a 1 bit or a 0 bit on Z line 440. The signal on line 403 may also cause the setting of 1-bit random number generator 438 to be altered in some predetermined fashion. The signals on Z line 440 and on V1–V3 lines 261–263 are applied to a decoder circuit which includes AND gates 441–446, OR gates 481–483, and AND gates 458, 464, and 470. Assume, for example, that there is a signal on V1 line 261 and on Z line 440. In this case, AND gate 443 is fully conditioned to generate an output signal on line 473 which is applied through OR gate 482 and line 492 to one input of AND gate 464. Since there is no signal on V2 line 262 at this time, AND gate 464 is fully conditioned to generate an output signal on line 422 which is applied to store a bit in the second position of W register 426. Assuming that an empty position was not found at T3 time, AND gate 508 is fully conditioned at T4+ time (i.e. when delay 516 generates an output signal on line 514) to generate an output signal on line 506 which conditions gate 498 to apply the contents of W register 426 to V register 266. When this occurs, the setting of the V register is changed to have no bits in its first and third positions and a bit in its second position.

Assumng that an empty memory position was not found during T3 time and that there is a bit on V2 line 262, at T5 time AND gate 236 (FIG. 2B) is conditioned to generate an output signal on line 256 which conditions gate 241 to store the entry in memory buffer register 56 in scratch register 158. This then is the new bumped entry. Also at T5 time, a signal is applied through line 105 to compare circuit 430 (FIG. 3) to cause the count now set in counter 404 to be compared against the maximum count being applied to the comparator by generator 434. If these counts are equal, the comparator generates an output signal on line 176 which is applied to set TR3 trigger 174 to its ONE state. This means that a predetermined number of bumping cycles have been performed and that it is not desired to perform any more. If the two counts applied to comparator 430 at this time are not equal, trigger 3 remains in its ZERO state.

Under the conditions described above, at T6 time, the signal on V2 line 262 causes AND gate 281 (FIG. 2E) to be fully conditioned, resulting in an output signal on line 276 which conditions gate 146 to transfer the bumped entry from input register 18 to the accessed memory position in memory bank 11. Since neither AND gate 280 or 282 (FIGS. 2D and 2F respectively) are conditioned at this time, signals appear on lines 305 and 307 causing gates 245 and 247 to be conditioned to restore the entries contained in memory buffer registers 55 and 57 to the accessed memory positions in their respective memory banks.

At T7 time, AND gate 164 (FIG. 2B) is conditioned to generate an output signal on line 163. This signal conditions gate 160 to pass the new bumped entry stored in scratch register 158 through lines 166 to input register 18.

If trigger 3 were set at T5 time, AND gate 170 (FIG. 2C) is also fully conditioned at this time to generate an output signal on line 168 which conditions gate 162 to pass the new bumped entry in scratch register 158 through lines 182 to output register 90. The reason for the latter transfer is that, when trigger 3 is in its ONE state, the operation is being terminated even though there is still a bumped entry to be stored in the system. It is therefore necessary that this bumped entry be applied to the output device (not shown) to indicate that this entry is no longer stored in the system.

At T8 time, a signal is applied to one input of AND gate 372 (FIG. 2C). If an empty memory position were found to store the bumped entry during the preceding clock cycle, trigger 2 is in its ZERO state, and there is a signal on line 228 at this time. If it has been determined that further bumping cycles would be useless and trigger 3 is in its ONE state, there is a signal on line 172 at this time. If either of these two conditions exist, OR gate 230 (FIG. 2C) generates an output signal on line 370 fully conditioning AND gate 372 to generate an output signal on reset line 374. This signal resets all the registers in the system except output register 90 and indicates to the input-output device (not shown) that the system is ready for a new instruction. If neither of the two conditions indicated above exists, only the compare circuits 25–27 (FIGS. 2D–2F respectively) and 195–197 are reset at this time and the circuit is conditioned to attempt to store the bumped entry now contained in input register 18 in the system during the following clock cycle. The sequence of operations performed during this cycle is identical to that described above. Succeeding bumping cycles are performed until either an empty position is found in which to store one of the bumped entries or until a determination is made that further bumping operations would be useless and trigger TR3 is set to its ONE state. It has been determined that with an 80% packing factor in memory banks 10–12, an average of three such bumping cycles are required to store a new entry in the system.

At this point, the reason why each of the address transform circuits 30–32 must operate under a different set of criteria can be fully appreciated. If all three address transform circuits used the same criteria, a name which transformed to the first address position in memory bank 10 would also transform to the first address positions in memory banks 11 and 12. The fourth and subsequent names which transformed to this address could not be stored in the system. However, where each address transform circuit used a different criteria, one name which transforms to the first address position in memory bank 10 may, for example, transform to the fifteenth memory position in memory bank 11 and to the eighth address position in memory bank 12, and a second name which transforms to the first address position in memory bank 10 may, for example, transform to the fifth and ninth memory positions in memory banks 11 and 12 respectively. The number of names which may be applied to the system before memory saturation occurs is therefore greatly increased.

Since most of the steps performed during the name-delete, data-write, and data-read (i.e. the F2, F3, and F4) operations are the same, these three operations will be described concurrently. With all three of these operations, the first step is to apply the name identifying the desired data unit through input bus 20 to input register 18. For a data-write operation, the data to be written is included with the name applied to input register 18. A signal is also applied to the appropriate one of the function lines 112–114. At T1 time, a signal is applied through line 101 and OR gate 187 to condition gate 186 (FIG. 2A) to pass the name stored in input register 18 through lines 188 to address transform circuits 30–32 (FIGS. 2D–2F respectively). At T2 time, a signal is applied to line 102, energizing each of the address transform circuits to operate on the applied name causing three different addresses to be generated which are applied to memory address registers 40–42 respectively. The contents of the addresses applied to memory address registers 40–42 are read out from memory banks 10–12 respectively into memory buffer registers 55–47. At T3 time, a signal is applied to line 103 permitting the inputs applied to compare circuits 25–27 (FIGS. 2D–2F respectively) to be compared. If the name applied to input register 18 is in the system, one of these comparisons will be successful resulting in an output signal on an N line 65–67. It is assumed at this time that only one of the comparisons will be successful. A situation where this might not be true will be considered briefly later.

Assume, for example, that the matching entry is contained in memory buffer register 55 (FIG. 2D). This means that compare circuit 25 is generating an output signal on N1 line 65 at this time. Since there is a signal on one of the F2, F3, or F4 lines 112–114, OR gate 116 (FIG. 2A) is conditioned to generate an output signal on line 118 which sets trigger 1 (FIG. 2B) to its ONE state. Under these conditions, at T4 time, all inputs to AND gate 125 (FIG. 2A) are present causing an output signal on line 250 which conditions gate 70 to pass the entry contained in memory buffer register 55 through lines 254 to output register 90 (FIG. 2C). At this time, the signal on N1 line 61 is also passed through OR gate 360 (FIG. 2C) to match line 362.

Assume first that a data-read (F4) operation is being performed. Under these conditions, neither of the inputs to OR gate 328 (FIG. 2D) are present, and therefore, at T6 time, none of the inputs to OR gate 300 are present. This means that AND gates 280–282 are deconditioned and AND gates 290–292 conditioned. The resulting output signals on lines 285–287 condition gates 245–247 to pass the entires in memory buffer registers 55–57 to the accessed positions in memory banks 10–12. The accessed entries are in this manner rewritten into the address positions from which they were read. A non-destructive readout function is in this manner effected.

If, instead of a data-read operation, a data-write (F3) operation is being performed, at T6 time, there is a signal on F3 line 113 which conditions AND gate 138 (FIG. 2A) to generate an output signal on line 136 conditioning gate 134 to pass the entry in input register 18 through lines 144 to the data input of gate 145 (FIG. 2D). The signal on line 113 and on N1 line 65 fully conditions AND gate 320 (FIG. 2D) to generate an output signal which is applied through OR gate 300 and line 295 to fully condition AND gate 280. This causes gate 145 to be conditioned to pass the new entry into the accessed position in memory bank 10. The accessed positions in memory banks 11 and 12 are rewritten in the same manner as that described above when a data-read operation is performed.

If a name-delete (F2) operation is being performed, at T6 time, AND gate 154 (FIG. 2B) is fully conditioned to generate an output signal on line 152 which conditions gate 150 to pass the entry in scratch register 158 through lines 144 to the data input of gate 145. Since scratch register 158 was reset at the end of the last operation, this register contains all zeros at this time. The signals on F2 line 112 and N1 line 65 cause gate 145 to be conditioned at this time in a manner previously described to pass the all 0's entry into the accessed position in memory bank 10. This effectively deletes the entry which was stored at this accessed position and leaves the accessed position empty. As before, the entries in memory buffer registers 56 and 57 (FIGS. 2E and 2F respectively) are restored to the accessed positions in their associated memory banks.

The signal on match line 362 is applied through OR gate 230 to one input of AND gate 372. If the name applied to input register 18 is not in the system, the absence of a match signal on line 362 causes a signal on line 366 which is applied as one input to AND gate 130. Since an F2, F3, or F4 operation is being performed, trigger 1 is in its ONE state causing a signal on ONE-side output line 122 which fully conditions AND gate 130 to generate an output signal on line 368. The signal on line 368 is applied through OR gate 230 and line 370 to one input of AND gate 372. Therefore, at T8 time, AND gate 372 is fully conditioned whether there was a match or a no match during the preceding operation. The output signal on R line 374 from AND gate 372 is applied to reset all the registers in the system except output register 90 and to indicate to the input-output device (not shown) that the operation has been completed. Any one of the three operations described above is therefore performed during one cycle of memory banks 10–12. If the desired entry is not in the system, an indication of this is also received during the same memory cycle.

*Alternative embodiments*

In the embodiment of the invention shown in FIGS. 1 and 2A–2F, the memory device employed was of the random access type. An example of such a memory device is a magnetic core matrix memory array. FIGURE 4 shows an embodiment of the invention using a sequential access device such as a magnetic drum 550. To assist in correlating the embodiments of the invention shown in FIGS. 1 and 4, like numbers have been used to identify like elements where possible.

Referring to FIG. 4, it is seen that the embodiment shown therein includes an input bus 20 applying data to an input register 18. The name portion of the entry stored in input register 18 is applied through lines 22 to address transform circuits 30–32 and to one input of compare circuit 552. The address transform circuits shown in FIG. 4 are the same as those shown in FIG. 1. Output lines 35–37 from address transform circuits 30–32 respectively are connected as the inputs to drum address registers (DAR's) 555–557 respectively. The addresses in drum address registers 555–557 are applied through lines 560–562 respectively to one input of compare circuits 565–567. The other input to compare circuits 565–567 is output lines 570 from actual address register (AAR) 572. Register 572 contains the address which read heads 574 of drum 550 are positioned over at any given time. When the inputs applied to one of the compare circuits 565–567 are equal it generates an output signal on a line 575–577 respectively. The lines 575–577 energize read heads 574. Output lines 580 from read heads 574 are applied to drum 550.

Data output lines 584 from read heads 574 are connected as the inputs to drum buffer register 586. The name portion of the contents of drum buffer register 586 is applied through lines 588 to the other input of compare circuit 552. The entire contents of drum buffer register 586 are applied through lines 590 to the information input of gate 592. The conditioning input to gates 592 and 598 is output line 595 from compare circuit 552. A signal appears on line 595 when the inputs applied to the compare circuit are equal. Output lines 594 from gate 592 are connected as the inputs to output register 90. Output lines 92 from output register 90 are connected to the input-output device (not shown) for the system. The information input to gate 598 is output lines 16 from input register 18. Output lines 600 from gate 598 are connected to energize write heads 602. Output lines 604 from write head 602 are applied to drum 550. Write heads 602 are positioned a predetermined number of degrees advanced from read heads 574 on drum 550.

The embodiment of the invention shown in FIG. 4 operates in a manner substantially the same as that for the embodiment of the invention shown in FIG. 1. To add a new name to the drum 550, the new name is applied through lines 20 to input register 18. From input register 18, the name is applied through lines 22 to address transform circuits 30–32. The resulting three addresses are stored in drum address registers 555–557. These addresses are compared against the address in actual address register 572 in compare circuits 565–567. When a successful comparison is had in one of these comparators, the resulting output signal on a line 575–577 energizes read head 574 to cause the entry then being accessed by the read head to be read out into drum buffer register 586. A determination is then made as to whether the memory position read into buffer register 586 is empty and the name portion of the entry read into register 586 is compared with the name in input register 18 in compare circuit 552. If the accessed position is found to be empty, a signal is applied in a manner not shown to condition gate 598 to apply the new entry to write heads 602. The write heads are spaced sufficiently advanced from the read heads to permit the necessary compare operations to be performed between the reading and writing. If the comparison in comparator 552 is successful, then the signal on line 595 is used to terminate the add-a-name operation. If the accessed memory position is not empty and the comparison in comparator 552 is unsuccessful, nothing further happens until the address in AAR is again equal to the address in one of the drum address registers.

If, after a complete rotation of drum 550, neither a matching entry nor an empty position has been found on drum 550, the next time that a match is found between the contents of AAR and one of the drum address registers, the contents of that address position is bumped and the input name stored at that address position. The bumped name is then transformed and an attempt made to store it on the drum. The bumping routine is similar to that previously described, the main difference being that the entry which is bumped is always the first one which comes under the head after a complete rotation of the drum rather than one randomly selected by a random-bump-vector generator 180 (FIG. 2B).

For a name-delete, data-write, or data-read operation, the name, and data where appropriate, are applied through data bus 20 to input register 18, and the name portion of the input applied through lines 22 to address transform circuits 30–32. The three addresses generated as a result of this operation are stored in drum address registers 555–557. Each time the contents of AAR are equal to the address in one of the drum address registers, read heads 574 are energized causing the entry then under the read heads to be read into drum buffer register 586. The name portion of the entry read into buffer register 586 is compared in compare circuit 552 with the name portion of the entry in input register 18. If this comparison is successful, a signal is applied through line 595 to condition gate 592 to transfer the contents of the drum buffer register into output register 90. From output register 90, the entry is transferred to the circuit input-output device (not shown). For a name-delete operation, all zeros would be written into the accessed position when it reached write head 602 and for a data-write operation, the signal on line 595 from compare circuit 552 would condition gate 598 to pass the new data stored in input register 18 to write head 602 at the appropriate time. If an entry for an applied name is not stored on drum 550, a full revolution of drum 550 is required to ascertain this fact.

In the embodiment of the invention shown in FIG. 1, the memory was partitioned so as to eliminate the possibility of two address positions using the same sense line being accessed at the same time. For such a memory to operate in a non-partitioned mode, the generated address positions would have to be sequentially accessed. This would, to a large extent, defeat the purpose of the invention. In the embodiment of the invention shown in FIG. 4, it was not indicated whether the memory was partitioned or not. Since there is no sense line problem with a drum or similar device, the memory need not be partitioned, and the three addresses generated by the three different address transform circuits may in fact fall anywhere on the drum. However, an advantage is obtained when the drum is partitioned in that it assures a minimal amount of angular separation between entries.

The embodiment of FIG. 4 has another advantage in that the electronics of the read and write circuits are utilized only during an actual read and write operation. Therefore, several searches may be conducted simultaneously on the drum by providing additional input registers 18 and additional drum address registers 555–557.

It is of course apparent that the three address systems shown in FIGS. 1–4 are merely illustrative and that any number of addresses could be generated provided this number is greater than 1. However, with a two-address system, the theoretical maximum packing factor for large memories is about 65%. In order that an entry might be be stored within the system within a reasonable number of bumping cycles, the actual packing factor would probably have to be held down to around 50%. For this reason, the two-address embodiment, while possible, is not particularly practical. With a three-address system, the theoretical maximum packing factor for large memories goes up to 92%. This means that an actual packing factor of over 80% may be realized without requiring an excessive number of bumping cycles in order to store a new entry in the system. For this reason, the three-address embodiment used for the illustrative examples is both possible and practical. When four addresses are generated, the theoretical maximum packing factor for large memories goes up to about 97.5%, permitting an actual packing factor of an excess of 90%. It is apparent that additional increases in the number of addresses generated would result in a very small increase in the permissible packing factor. However, it is apparent that additional memory units may be added to the system as required without in any way disrupting the addressing scheme or requiring any repositioning of information. The system is therefore completely modular.

In addition to the bumping scheme illustrated in FIGS. 2A–2F and 3, there is at least one alternative bumping scheme which may be employed. This scheme, which is referred to as the parallel-three method, involves taking all three of the names which are in the accessed addresses and applying them in sequence to the three address transform circuits. The nine addresses (three of which are known to be occupied) thus generated are looked at to determine if any of them are empty. If none of these addresses are empty, the names in each of these accessed addresses are applied to the address transform circuits and the three possible address where each of these name may be stored are generated. These twenty-seven addresses (fifteen of which are known to be occupied) are then looked at to determine if any of them are empty. This process is repeated until the first empty address position is located and the bumping routine is then initiated down the shortest path which is found in this manner. The search strategy for a vacant address postion could easily be implemented to avoid those addresses known to be occupied.

While it is not generally necessary, efficiency of storing new entries in the system may be improved by performing a periodic maintenance routine. This involves checking the entries in the system and rearranging them so that within the set of generated addresses, those appearing least frequently are occupied where possible and those appearing more frequently are vacant where possible.

Another advantage of the systems illustrated in FIGS. 1–4 is that they permit up to three data units to be accessed during a single memory access cycle. This facility is valuable where variable length instructions and data are employed. However extensive use of this facility disturbs the random nature of the storage and substantially reduces the permissible packing factor.

Another advantage of the system shown in FIGS. 1–4 is that it permits the use of memories having imperfect bit positions. A short table may be provided of address positions having imperfect bits and storage in these bit positions inhibited. Since there are two other address positions in which the entry may be stored, the fact that one of the accessed positions cannot be used does not prevent the entry from being stored in the system. One simple way of implementing this without the use of a table is to merely preset the S bit position of all addresses containing an imperfect bit to a 1.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a content addressable memory system of the type in which a plurality of information items each including an identifier portion are stored in a plurality of addressable memory locations in a memory, and each item is stored at an address which is an address transformation of the contents of at least the identifier portion of the information item, the improvement comprising:

(a) at least first and second different address transform circuits responsive when an identifier portion of an information item is applied thereto to transform said identifier portion into first and second different addresses in said memory;

(b) input means for receiving as an input an identifier portion of an information item to be retrieved from said memory;

(c) coupling means coupling said input means and said first and second address transform circuits for applying said input identifier to said first and second address transform circuits;

(d) control means controlling said address transform circuits to concurrently transform said applied input identifier into first and second different addresses in said memory;

(e) interrogate means responsive to said first and second addresses for reading out of said memory the information items stored in the locations specified by said first and second addresses in said memory;

(f) and compare means coupled to said memory and to said input means for comparing the input identifier portion of the information item with the identifier portion of each of said information items read out of said first and second address locations in said memory.

2. In a content addressable memory system of the type in which a plurality of information items each including an identifier portion are stored in a plurality of addressable memory locations in a memory, and each item is stored at an address which is an address transformation of the contents of at least the identifier portion of the information item, the improvement comprising:

(a) address transform circuitry responsive when an identifier portion of an information item is applied thereto to transform said identifier portion into at least first and second different addresses in said memory;

(b) input means for receiving as an input an identifier portion of an information item to be retrieved from said memory;

(c) means coupling said input means and said address transform circuitry for applying said input identifier to said address transform circuitry;

(d) control means controlling said address transform circuitry to transform said applied input identifier into first and second different addresses in said memory;

(e) interrogate means responsive to said first and second addresses for reading out of said memory the information items stored in the locations specified by said first and second addresses in said memory;

(f) and compare means coupled to said memory and to said input means for comparing the input identifier portion of the information item with the identifier portion of each of said information items read out of said first and second address locations in said memory.

3. The memory system of claim 2 wherein said address transform circuitry includes at least first and second different address transform circuits, and said means for controlling said address transform circuits controls said first and second address transform circuits to concurrently transform said input identifier into first and second different addresses.

4. The memory system of claim 2 wherein said memory includes at least first and second different memory units, and said first address and second addresses transformed by said address transform circuitry are respectively addresses for said first and second memory units.

5. The memory system of claim 2 wherein said memory is a sequential access memory.

6. The memory system of claim 3 wherein said system includes:

(a) means for applying to said input means an identifier portion of an information item to be stored in said memory;

(b) said coupling means applying said identifier portion of said information item to be stored at said first and second address transform circuits;

(c) said control means controlling said first and second address transform circuits to concurrently transform said identifier portion of said information item to be stored into first and second different addresses in said memory;

(d) and means coupling said input means and said memory means for transferring said input information item to be stored into one of the locations in said memory specified by one of said first and second addresses transformed by said first and second address transform circuits from said identifier portion of the information item to be stored ;

(e) means for applying an input identifier portion of an information item to said first and second key transformation circuits and for controlling said first and second address transform circuits to concurrently transform said applied input identifier into first and second different addresses in said memory;

(f) means responsive to said first and second addresses for reading out of said memory the information items stored at said first and second addresses;

(g) comparing means for comparing the input identifier portion of the information item to the identifier portion of each of said information items read out of said memory.

7. In a content addressable memory of the type in which a plurality of information items each including an identifier portion are stored in a plurality of addressable memory locations in the memory, and each item is stored at an address which is an address transformation of the contents of at least the identifier portion of the information item, and the information items are retrieved from said memory in response to inputs including the identifier portion of the information item to be retrieved, the improvement comprising:

(a) input means for receiving at least the identifier portion of an information item;

(b) at least first and second different address transform circuits repsonsive when an identifier portion of an information item is applied thereto to transform the identifier portion into the addresses of at least first and second different locations in said memory;

(c) means for applying said identifier portion of said information item in said input means to said first and second address transform circuits and controlling said circuits to concurrently transform said identifier portion into the adresses of first and second different memory locations in said memory;

(d) and memory control means responsive to said address transform circuits for addressing at least one of said first and second locations in said memory specified by addresses transformed by said first and second transform circuits.

8. In a content addressable memory of the type in which a plurality of information items each including an identifier portion are stored in a plurality of addressable memory locations in the memory, and each item is stored at an address which is an address transformation of the contents of at least the identifier portion of the information item, and the information items are retrieved from said memory in response to inputs including the identifier portion of the information item to be retrieved, the improvement comprising;

(a) input means for receiving at least the identifier portion of an information item;

(b) address transform circuitry responsive when an identifier portion of an information item is applied thereto to transform the identifier portion into the addresses of first and second different locations in said memory;

(c) means for applying said identifier portion of said information item in said input means to said address transform circuitry on controlling said circuitry to concurrently transform said identifier portion into the addresses of first and second different memory locations in said memory;

(d) and memory control means responsive to said address transform circuitry for addresses at least one of said first and second locations in said memory specified by said addresses transformed by said first and second transform circuitry.

9. The memory system of claim 8 wherein said input identifier in said input means is the identifier of an information item to be stored in said memory; and memory control means is responsive to said address transform circuitry to address each of said first and second locations and interrogate said locations to determine whether they art empty or are storing information items.

10. The memory system of claim 9 wherein when one of said first locations is empty, said memory control means is operable to cause said portion of said information item in said input means to be stored in that location of said memory.

11. The memory system of claim 9 wherein when each of said locations is storing an information item, said memory control means is operable to read the information item out of one of said locations and cause said portion of said information item in said input means to be stored in that location.

12. The memory system of claim 11 wherein said system includes means for applying the identifier portion of said information item read out of one of said locations to said address transform circuitry;

said address transform circuitry responding to transform said identified into the address of the location in which the information item was originally stored and at least one more address of another location in said memory at which said information item can be stored and the address of which is an address transform of said identifier.

13. The memory system of claim 8 wherein said address transform circuitry consists of first, second and third different address transform circuits which respond to applied identifiers to produce first, second and third different addresses.

14. The memory system of claim 8 wherein said memory is a sequential access memory.

15. The memory system of claim 8 wherein said input identifier in said input means is the identifier of an information item to be retrieved from said memory;

said memory control means being operable to interrogate each of said first and second address locations to read out at least the identifier portion of the information item of each location and compare means coupled to said memory and said input means for comparing said identifier read out of said memory with the identifier in said input means.

References Cited

UNITED STATES PATENTS

| | | | |
|---|---|---|---|
| 3,081,447 | 12/1963 | Sierra | 340—172.5 |
| 3,229,255 | 1/1966 | Anderson | 340—172.5 |
| 3,243,786 | 3/1966 | Davis | 340—172.5 X |
| 3,245,052 | 4/1966 | Lewin | 340—172.5 X |
| 3,253,265 | 5/1966 | Lindquist | 340—172.5 |

OTHER REFERENCES

G. Schay and N. Raver: "A Method for Key-to-Address Transformations," April 1963, I.B.M. Journal, pages 121–126.

M. Hanan and F. P. Palermo: "An Application of Coding Theory to a File Address Problem," April 1963, I.B.M. Journal, pages 127–129.

ROBERT C. BAILEY, *Primary Examiner.*

PAUL J. HENON, *Examiner.*

P. R. WOODS, *Assistant Exaimner.*